United States Patent [19]

Fuchs et al.

[11] 4,052,157

[45] Oct. 4, 1977

[54] USE OF WATER-SOLUBLE DISAZO DYESTUFFS FOR DYEING OR PRINTING SYNTHETIC TEXTILE MATERIAL OF POLYAMIDE OR POLYURETHANE FIBERS

[75] Inventors: Hermann Fuchs, Kelkheim, Taunus; Klaus Filzinger, Hofheim, Taunus, both of Germany

[73] Assignee: Hoechst Aktiengesellschaft, Frankfurt am Main, Germany

[21] Appl. No.: 638,647

[22] Filed: Dec. 8, 1975

[30] Foreign Application Priority Data

Dec. 9, 1974 Germany .............................. 2458196

[51] Int. Cl.² .................... C09B 27/00; D06P 1/02
[52] U.S. Cl. ............................... 8/41 R; 8/71; 8/41 B; 8/178 R; 260/176
[58] Field of Search ............... 8/41 B, 178 R, 178 E, 8/41 R, 71; 260/176

[56] References Cited

U.S. PATENT DOCUMENTS

| | | | |
|---|---|---|---|
| 2,251,921 | 8/1941 | Dickey et al. | 260/193 |
| 2,474,024 | 6/1949 | Anderson | 260/176 |
| 3,351,580 | 11/1967 | Koike et al. | 260/160 |

FOREIGN PATENT DOCUMENTS

| | | |
|---|---|---|
| 99,381 | 9/1898 | Germany |
| 101,917 | 2/1899 | Germany |

Primary Examiner—Joseph L. Schofer
Assistant Examiner—A. L. Clingman
Attorney, Agent, or Firm—Curtis, Morris & Safford

[57] ABSTRACT

Use of a water-soluble disazo dyestuff of the formula

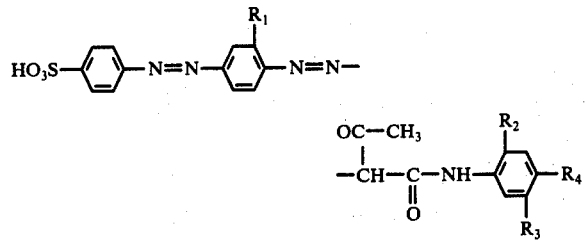

in which $R_1$ represents a hydrogen atom or the sulfonic acid group, $R_2$ represents a chlorine atom or the methoxy group, and $R_3$ and $R_4$ each represents a hydrogen atom or a methoxy group, for the dyeing or printing of synthetic textile material consisting of or containing polyamide or polyurethane fibers, the dyestuff used yielding on the said fibrous material excellent, clear golden-yellow to orange dyeings or prints being distinguished by very good properties as to fastness to light and to wetting.

5 Claims, No Drawings

USE OF WATER-SOLUBLE DISAZO DYESTUFFS FOR DYEING OR PRINTING SYNTHETIC TEXTILE MATERIAL OF POLYAMIDE OR POLYURETHANE FIBERS

The present invention relates to the use of water-soluble disazo dyestuffs for dyeing or printing synthetic textile material made of polyamide or polyurethane fibers.

The water-soluble disazo dyestuffs of the invention correspond to the general formula

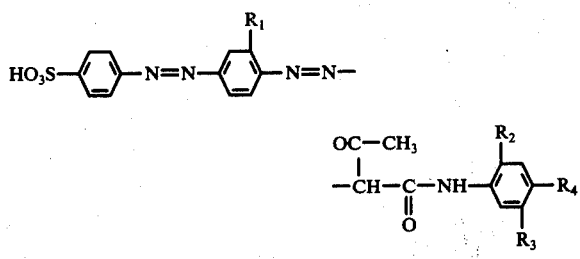

in which $R_1$ is a hydrogen atom or the sulfonic acid group, $R_2$ is a chlorine atom or the methoxy group, $R_3$ and $R_4$ each is a hydrogen atom or a methoxy group. The water-soluble disazo dyestuffs of the invention are used for dyeing or printing synthetic textile material which consists of or contains polyamide or polyurethane fibers.

The dyestuffs of the invention referred to hereinbefore are advantageously used in the form of neutral to acid dyebaths or printing pastes.

The dyestuffs related to in this invention yield on the textile material in question excellent, clear golden-yellow to orange dyeings or prints which reveal very good properties as to their fastness to wetting and very good to excellent fastness properties to light in the Xenotest and in the daylight. Moreover, the dyestuffs show in the dyeing process a very good build-up property.

Suitable synthetic textile materials are, for example threads, flocks woven and knitted fabrics made of synthetic polyamides or polyurethanes. The term synthetic polyamides comprises especially the polycondensation products obtainable from caprolactam, hexamethylene diamine and adipic acid or from ω-aminoundecylic acid.

The dyestuffs of the invention are used in the form of their free acids or in the form of their salts, especially the alkali metal salts, preferably the sodium salts. They can also be used in mixture with other dyestuffs suitable for the dyeing of the synthetic textile material mentioned above.

The dyebaths contain per 1,000 parts by weight of dyebath, 0,01 to 20 parts by weight of dyestuff, 0.05 to 10 parts by weight of the usual dyeing auxiliary and 0.05 to 10 parts by weight of the usual dispersing agents. [As to known and usual dyeing auxiliaries and dispersing agents cf. "Lehrbuch der Textilchemie" by Hermann Rath, 3rd edition, Springer-Verlag Berlin—Heidelberg — New York (1972), pages 773 ff., and "Tenside-Textilhilfsmittel-Waschrohstoffe" by Kurt Lindner, Wissenschaftliche Verlagsgesellschaft m.b.H, Stuttgart (1971), volume III, pages 2 756 ff]. The type of adjuvant is chosen such that the dyebath enters a neutral or acid reaction. When 0.01 to 20 parts by weight of an acid, for example formic acid or acetic acid or, also, a mineral acid, or alkali metal salts of formic acid or acetic acid are added to the dyebath, the dyeing process can be performed under a slightly to strongly acid reaction, preferably, however, from a slightly acid or neutral bath and advantageously at a temperature within the range of from 90° to 105° C.

The printing pastes used for printing contain per 1,000 parts by weight generally from 1 to 50 parts by weight of dyestuff, from 250 to 650 parts by weight of the usual thickening agents, for example crystal gum, from 1 to 50 parts by weight of the usual printing auxiliaries, from 1 to 50 parts by weight of the usual dispersing agents and from 5 to 50 parts by weight of a salt of a weak base, and of a strong mineral acid or an organic acid, for example ammonium sulfate or ammonium stearate.

[As to known and usual thickening agents, printing auxiliaries and dispersing agents cf. "Lehrbuch der Textilchemie" by Hermann Rath as mentioned more above, pages 779 ff; and the reference to Kurt Lindner as given more above, pages 2810 ff.] The deficit was made up to 1,000 parts by weight by adding water or thickening agents. The printed fabrics are dried and treated with hot air or steam for a short time.

The very good properties of fastness to wetting are, for example, the fastness to washing at 40° and 60° C, generally called "washing 1 and 3", the fastness to water, under severe conditions, the fastness to alkaline and acid perspiration, the fastness to hypochlorite bleach, mild and severe, the fastness to fulling, in acid and alkaline medium, the fastness to steaming, the fastness to alkalis, the fastness to acids, the fastness to decatizing and the fastness to dry cleaning.

In the dyeing process itself, the dyestuffs are distinguished by a good build-up.

The dyestuffs of the general formula mentioned above are prepared in the usual manner by diazotizing 1-amino-azobenzene-4'-sulfonic acid, or 1-aminoazobenzene-2,4'-disulfonic acid and following coupling with acetoacetic acid anilides which may contain the radicals $R_2$, $R_3$ and $R_4$ mentioned, in the slightly alkaline to strongly alkaline pH-range at a temperature ranging from 0° – 30° C. The dyestuffs are isolated by salting out or by spray-drying.

Due to their very pure shades and the very high standard of fastness properties, especially the very good fastness to wetting and to light, the dyestuffs of the invention suit very well for the dyeing of synthetic textile fibers and for carpet fibers made of synthetic polyamides or polyurethanes. These properties considerably broaden the scale in the field of dyeing and printing the synthetic fibrous materials mentioned above.

The following Examples illustrate the invention; the parts being by weight unless otherwise stated:

EXAMPLE 1

100 Parts of polycaprolactam fabric were introduced in a bath heated to 40° C which contained 1 part of the dyestuff of the formula

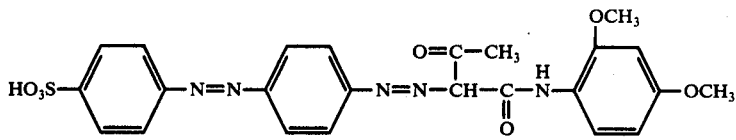

0.15 part of the addition product of 12 mols of ethylene oxide to 1 mol of stearyl amine, 0.40 part of the condensation product of 1 mol of cyanuric chloride (trichloro-s-triazine) with 3 mols of aniline-3-sulfonic acid, 2.0 parts of ammonium acetate and 1.0 part of acetic acid of 60% strength in 3,000 parts of water. The temperature of the dyebath was raised to 98° to 100° C within 15 minutes and dyeing was continued at 100° C for another 60 minutes. After the usual finishing, a limpid golden-yellow dyeing was obtained which had very good fastness properties as to washing at 40° and 60° C, to water under severe conditions, to chlorinated bath water, to acid and alkaline perspiration, to hypochlorite bleach, mild and severe, to fulling in alkaline and acid medium, to decatizing and to steaming, in the test for fastness to acid and to alkalis and in the exposure to the Xenotest light and to daylight.

EXAMPLE 2

When the dyestuff mentioned in Example 1 is replaced by the dyestuff of the formula

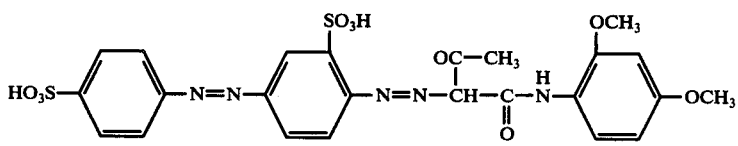

and the process is carried out as taught in that Example, a limpid, golden-yellow dyeing was obtained that had practically the same good fastness properties.

EXAMPLE 3

100 Parts of polyamide yarn were dyed as in Example 1 in a bath that contained 2.5 parts of the dyestuff of the formula

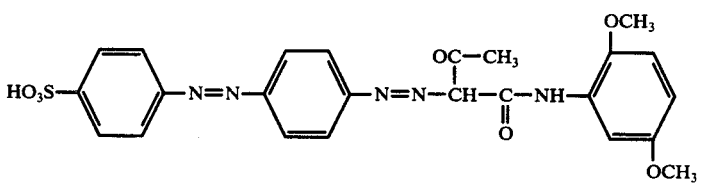

1.0 part of the addition product of 40 mols of ethylene oxide to 1 mol of castor oil, 2.0 parts of ammonium acetate and 2.0 parts of acetic acid of 60% strength in 3,000 parts of water.

After the usual finish, a limpid orange dyeing was obtained that demonstrated very good properties in the tests made in Example 1 for the general processing fastness properties mentioned.

EXAMPLE 4

When the dyestuff of Example 3 is replaced by the dyestuff of the formula

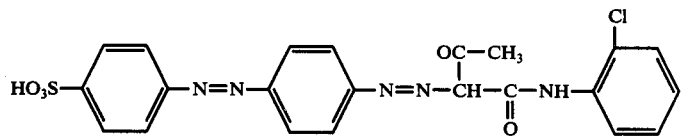

an intense, golden-yellow dyeing was obtained which showed very good properties in the tests made in Example 1 for the general processing fastnesses mentioned.

EXAMPLE 5

A polycaprolactam fabric was printed with a paste containing 10 parts of the dyestuff of the formula

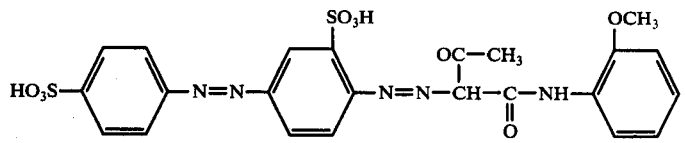

30 parts of dibutyl glycol, 250 parts of water, 650 parts of a crystal gum thickening, 30 parts of nitrobenzene-3-sulfonic acid and 30 parts of ammonium sulfate. The fabric so printed was dried and steamed at 100 to 102° C during 30 minutes. It was finished as usual by rinsing and drying. The golden-yellow print obtained had a very good fastness to light and very good general processing fastnesses.

EXAMPLE 6

100 Parts of a tufted carpet made of polyamide fibers that were preheated to 100° C in a saturated steam atmosphere passed, during 5 minutes, a solution heated to 100° to 102° C which contained 15 parts of the dyestuff mentioned in Example 1, 0.3 part of the addition product of 12 mols of ethylene oxide to stearyl amine, 2 parts of sodium acetate and 1 part of acetic acid. Then, the carpet was rinsed and dried. So, a level, golden-yellow dyeing was obtained that had excellent fastness to light and very good general processing fastnesses.

A needle felt carpet showed the same dyeing results as the above tufted carpet.

EXAMPLE 7

Polyamide carpet yarn was treated with a padding liquor up to a liquor-pick-up of 100% which liquor contained 10 parts of the dyestuff of the formula

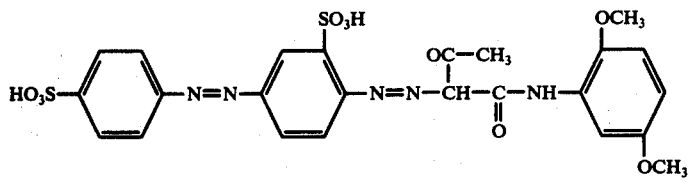

5 parts of locust bean flour, 4 parts of an addition product of 8 mols of ethylene oxide to 1 mol of isotridecyl alcohol and 15 parts of acetic acid of 60% strength in 1,000 parts of liquor, the material was steamed during 6 minutes at 100° to 102° C, and then rinsed cold. The golden-yellow dyeing obtained had very good general, processing fastnesses and very good to excellent fastness to the daylight.

EXAMPLE 8

When the dyestuff mentioned in Example 7 is replaced by the dyestuff of the formula

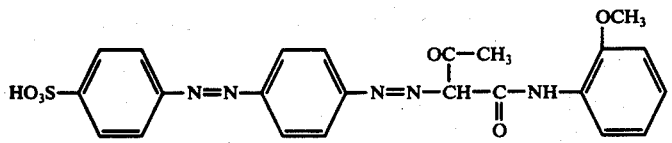

and the dyeing process is continued as taught in this Example, the polyamide carpet yarn showed a golden-yellow dyeing having the same good fastness properties.

The dyeing methods described in the above Examples apply for all the dyestuffs mentioned.

What is claimed is:

1. A process for the dyeing or printing of a synthetic textile material consisting of or containing polyamide or polyurethane fibers, which comprises coloring the said textile material with a dyestuff of the formula

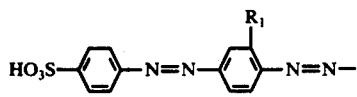

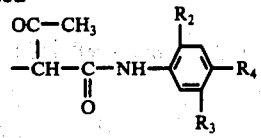

in which $R_1$ is hydrogen or $-SO_3H$, $R_2$ is chlorine or methoxy, and $R_3$ and $R_4$ each is hydrogen or methoxy.

2. A process as recited in claim 1, wherein the said textile material is dyed with 0.01 to 20 parts by weight of a dyestuff of the said formula per 1000 parts by weight of an aqueous bath in the presence of 0.05 to 10 parts by weight of a dyeing auxiliary and 0.05 to 10 parts by weight of a dispersing agent in a neutral to strongly acid medium between 90° and 105° C.

3. A process as recited in claim 1, wherein the said textile material is printed with an aqueous paste containing per 1000 parts by weight from 1 to 50 parts by weight of a dyestuff of the said formula, 250 to 650 parts by weight of a thickening agent, 1 to 50 parts by weight of a printing auxiliary, 1 to 50 parts by weight of a dispersing agent and 5 to 50 parts by weight of a salt of a weak base and a strong mineral acid, or of an organic acid, subsequently dried and steamed.

4. An aqueous dyebath for the dyeing of synthetic textile material consisting of or containing polyamide or polyurethane fibers, 1000 parts of which consisting of 0.01 to 20 parts of a dyestuff of the formula

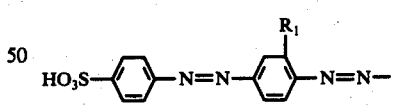

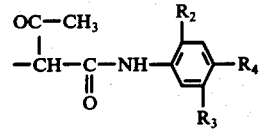

in which $R_1$ represents hydrogen or the sulfonic acid group, $R_2$ represents chlorine or methoxy, and $R_3$ and $R_4$ each represents hydrogen or methoxy, 0.05 to 10 parts of a usual dyeing auxiliary and 0.05 to 10 parts of a usual dispersing agent and, for adjusting the pH, 0.01 to 20 parts of an organic or mineral acid, and the pH value of the dyebath being from strongly acid to neutral.

5. An aqueous printing paste for the printing of synthetic textile material consisting of or containing polyamide or polyurethane fibers, 1000 parts of which consisting of 1 to 50 parts of a dyestuff of the formula

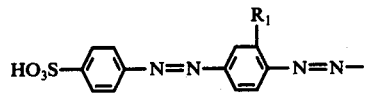

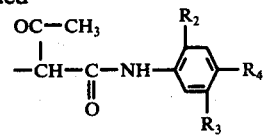

in which $R_1$ represents hydrogen or the sulfonic acid group, $R_2$ represents chlorine or methoxy, and $R_3$ and $R_4$ each represents hydrogen or methoxy, 250 to 650 parts of a usual thickening agent, 1 to 50 parts of a usual printing auxiliary, 1 to 50 parts of a usual dispersing agent and, for adjusting the pH, 5 to 50 parts of a salt of a weak base and a strong mineral acid or an organic acid, the deficit to 1000 parts being made up by water or thickening agent, and the pH value of the printing paste being from strongly acid to neutral.

* * * * *